United States Patent [19]
McMurray et al.

[11] Patent Number: 5,969,339
[45] Date of Patent: Oct. 19, 1999

[54] CONVEYOR TRACKING SYSTEM FOR PART DETECTION USING AN ARRAY OF PHOTOELECTRIC SENSORS

[75] Inventors: Gary V. McMurray, Atlanta; Wiley D. Holcombe, Jr., Decatur; Marlon Moses, Norcross; John A. Messenger, Alpharetta; Christopher Reynolds, Norcross, all of Ga.

[73] Assignee: Georgia Tech Research Corporation Office of Technology Licensing, Atlanta, Ga.

[21] Appl. No.: 08/806,085

[22] Filed: Feb. 25, 1997

Related U.S. Application Data

[60] Provisional application No. 60/012,249, Feb. 26, 1996.

[51] Int. Cl.$^6$ .............................. G01N 21/86; B25J 19/02
[52] U.S. Cl. ................................ 250/223 R; 250/206.1; 250/559.33; 901/47; 901/7
[58] Field of Search ........................... 250/223 R, 206.1, 250/208.2, 208.3, 559.33, 559.35; 356/375, 376; 901/47, 1, 7, 28, 37

[56] References Cited

U.S. PATENT DOCUMENTS

| | | | |
|---|---|---|---|
| 3,676,692 | 7/1972 | Nishikawa et al. | 250/231 |
| 3,742,222 | 6/1973 | Endl | 250/209 |
| 4,622,502 | 11/1986 | Maruo et al. | 318/640 |
| 4,847,911 | 7/1989 | Morimoto et al. | 382/8 |
| 4,876,728 | 10/1989 | Roth | 382/21 |
| 4,888,532 | 12/1989 | Jösson | 318/480 |
| 5,040,626 | 8/1991 | Paynter | 901/28 |
| 5,059,789 | 10/1991 | Salcudean | 250/206 |
| 5,164,579 | 11/1992 | Pryor et al. | 250/206 |
| 5,212,392 | 5/1993 | Berkean et al. | 250/561 |
| 5,311,999 | 5/1994 | Malow et al. | 209/583 |

OTHER PUBLICATIONS

J.G. Trout and R. G. Miles, titled "A Method for Characterizing Polygons In Terms of The Principal Axes", 10 (2–3) (1984) 347–350.

S. F. Bockman, titled "Generalizing the Formula for Areas of Polygons to Moments", The American Mathematical Monthly 96 (Feb. 1989) 131.

*Primary Examiner*—Que T. Le
*Assistant Examiner*—Kevin Pyo
*Attorney, Agent, or Firm*—Oldham & Oldham Co., L.P.A.

[57] ABSTRACT

A part tracking system comprised of an array of photoelectric sensors positioned at various angles with respect to a conveyor transporting parts such as pieces of poultry to create a field of detection. The angle arrangements of the array of photoelectric sensors circumscribes the parts with lines of varying angles to approximate the part outline or closed line integral with a polygon. As a part is conveyed through the array of photoelectric sensors each transition of the sensors provide a side of the polygon that circumscribes the part. From this the vertices of the polygon can be determined which allows the centroid and angle of the major axis of the part to be calculated thereby providing the coordinates for the part's location on the conveyor. The coordinates are then conveyed to a robotic controller which manipulates an end effector to grasp the part.

19 Claims, 7 Drawing Sheets

CONVEYOR TRACKING SYSTEM FOR PART DETECTION USING AN ARRAY OF PHOTOELECTRIC SENSORS

This application claims the benefit of U.S. Provisional Application No. 60/012,249, filed Feb. 26, 1996.

TECHNICAL FIELD

The present invention relates to a part tracking system for use with a conveyor belt, and more specifically to a part tracking system which uses an array of photoelectric sensors to determine the centroid and major axis of parts moving on a conveyor and provides coordinates for the parts location to a pick-and-place robot.

BACKGROUND OF THE INVENTION

A number of industries today commonly integrate a high level of automation into their manufacturing processes. Such automation is capable of increasing quality and reducing the lead time required to produce many modern products such as electronic devices. Machines and electronically controlled robots are capable of tasks that require great accuracy which in many cases humans cannot do well. Examples of such tasks are placing integrated circuits on circuit boards at a specification plus or minus 1 millimeter which, for all practical purposes, is impossible for humans to perform. Robots in particular are able to perform tasks that humans do not want to do or that are dangerous to humans, and in many cases can perform these functions more efficiently.

Many of these tasks are relatively simple so that robots can be programmed or "taught" easily. Yet the problem with these types of robots is their lack of intelligence and high cost. Without training or programming, these robots are of little use. In addition, a programmer is needed to communicate with the robot whenever changes need to be made to its functions. While the robots found in the prior art find their place in many manufacturing settings they are not practical in all environments. The poultry industry, for example, has many different sizes of chicken pieces ranging from the whole chicken to chicken legs and breast fillets. Not only are these pieces not of a prescribed dimension, but they are deformable, wet and could be easily damaged by prior art robots. Specialized concerns of the poultry industry are that robots do not harm the product and that the robots be able to survive in the rugged environment typically found in the poultry industry and that they be capable of satisfactory cleaning to comply with USDA health standards.

An additional drawback with most robots found in the prior art and used in a number of industrial manufacturing settings, is the immense capital investment necessary to finance such equipment. The poultry industry, on the other hand, is particularly concerned with a quicker payback period, typically one to two years which has led to the demand for a low cost, flexible robot that can pick-and-place a variety of poultry parts while surviving in the harsh environments.

A more flexible pick-and-place robot could be utilized by the poultry industry to gain competitive advantages. Some of the tasks required are pick-and-place operations easily accomplished by humans. While the poultry industry currently has a great deal of fixed automation, people still must perform a number of repetitive tasks that are currently difficult for robots to perform. It would be advantageous to use robotics because they can perform tasks more consistently and function 24 hours a day. Also, the cost of operating a robot is much less expensive in the long term. For these reasons, a demand would exist in the poultry industry if a robot could manipulate slippery, different-sized, deformable pieces of product at an affordable price installation and maintenance.

To perform pick-and-place operations of individual poultry parts, a robot must have an end effector or hand that is capable of grasping a variety of parts. The Intelligent Machines Branch of the Georgia Tech Research Institute has developed the first human level performance robot called the Intelligent Integrated Belt Manipulator. This robot is a three degree of freedom, pick-and-place robot which interfaces with a conveyor. The end effector models the grasping of the human hand which allows a limited tolerance or error in the determination of the center of gravity of the part that is to be picked up.

While pick-and-place robots are capable of handling parts, such as pieces of poultry, the robots must be told the location of the part in relation to itself and exactly where to go to pick up the part. Several methods in the prior art have been used to determine the location of parts on conveyors. Machine vision has frequently been used for this purpose, which can be done in both two and three dimensions. Machine vision is typically implemented using a black and white camera to capture images of the parts on a conveyor. A predetermined algorithm can then be used to calculate centroid and major axis from the pixels of the image. To fully implement such a machine vision system, the following equipment and software is necessary: a gray scale camera, substantial lighting equipment, an image digitizer and processor, software which calculates the centroid and major axis of individual images and software to interface the machine vision system to the pick-and-place robot's control system. The described machine vision system has the advantage of excellent accuracy in that the centroid can be computed to within one pixel. For a camera with 256 by 256 resolution and a field of view of three feet by three feet, the dimension of a pixel is a square of 0.14 inches per side. This greatly exceeds the accuracy needed for use with objects such as pieces of poultry. Despite its accuracy, there are numerous disadvantages to machine vision tracking which include a high expenditure for vision hardware and lighting, sensitive equipment not capable of withstanding harsh environments found in poultry processing plants, the inability to wash the machine vision hardware effectively and a delay of close to half a second to capture images before processing them.

An alternate approach to part location used in the prior art employs photoelectric sensors. These sensors can be used for parts of known dimensions and specific orientations to determine part location coordinates. In one known application photoelectric sensors are used to determine if broken bottles exist in a beverage processing line. If a broken bottle is detected, a plunger pushes the case of bottles off the processing line for reprocessing. This particular example is a one dimensional tracking system.

SUMMARY OF THE INVENTION

Based upon the foregoing, there has been found a need to provide a part tracking system which will control a pick-and-place robot with sufficient accuracy and speed while costing significantly less than the alternatives found in the prior art such as machine vision.

It is therefore a main object of the invention to provide a tracking system capable of locating a part, such as a piece of poultry, in two dimensions on a conveyor belt and returning the coordinates of the parts location to a robot controller which in turn directs the robot to grasp the part.

It is another object of the invention to provide a tracking system capable of withstanding harsh environments such as those found in food processing plants which need continuous cleaning. The system must be water resistant to prevent damage to electrical components and water must not compromise the accuracy of the optics required to track the parts.

A further object of the invention is to provide a tracking system which does not come in contact with the parts being monitored. When used in applications such as tracking poultry parts, contact between the tracking system and the poultry parts would present the possibility of harming the parts or transferring dirt or disease thereby contaminating the poultry parts.

An additional object of the invention is to provide a tracking system significantly less expensive than systems of the prior art allowing users to quickly realize a return on their initial investment in the system.

These and other objects and advantages of the invention are accomplished using an array of photoelectric sensors positioned at various angles with respect to a conveyor transporting parts such as pieces of poultry to create a field of detection. The angle arrangements of the array of photoelectric sensors circumscribes the parts with lines of varying angles to approximate the part outline or closed line integral with a polygon. As a part is conveyed through the array of photoelectric sensors each transition of the sensors provide a side of the polygon that circumscribes the part. From this the vertices of the polygon can be determined which allows the centroid and angle of the major axis of the part to be calculated thereby providing the coordinates for the part's location on the conveyor. The coordinates are then conveyed to a robotic controller which manipulates an end effector to grasp the part.

BRIEF DESCRIPTION OF THE DRAWINGS

These and other objects and advantages of the invention will become apparent upon a reading of the following detailed description in conjunction with the figures, wherein:

FIG. 1 shows a perspective view of a robot having an end effector positioned adjacent a conveyor for manipulating work pieces situated upon and being transferred by the conveyor. The robot and conveyor combination shown is typical of that which the part tracking system of the present invention is to interfaced with;

FIG. 6, which consists of FIGS. 6a and 6b, show a simplified top plan view of how the vertices of the polygon surrounding a work piece is formed with FIG. 6a showing the extended beam paths formed by the array of photoelectric sensors after the work piece has passed through the array

FIG. 9, which consists of FIG. 9a through 9d, shows a top plan view of the array of photoelectric sensors with their associated beam and calibration angles superimposed.

FIG. 10 shows a top plan view of the array of photoelectric sensors with the center beam calibration angles superimposed.

DETAILED DESCRIPTION

Figure 1:
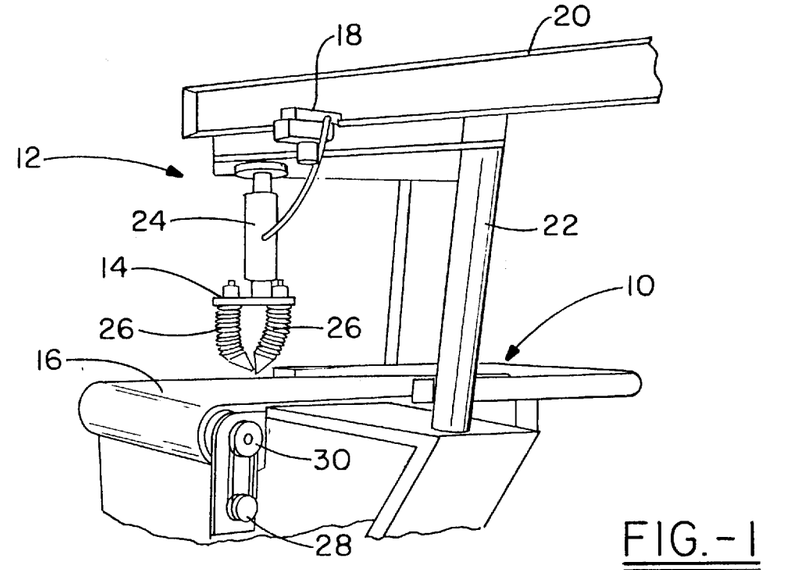

The part tracking system of the present invention is used in conjunction with and to control a positioning apparatus and more specifically a robot in combination with a conveyor as shown in FIG. 1. Pick and place robot 12 is a typical example of the type of robot and conveyor combination in which part tracking system 10 of the present invention is used with. Pick-and-place robot 12 is a robot with three degrees of freedom which interfaces with conveyor 16. Horizontal motion is guided by linear bearing 18 mounted on I-beam 20 located on top of steel column 22. Compliant end effector 14 functions as a hand to grasp a variety of parts as they pass on conveyor 16. Compliant end effector 14 is coupled to linear bearing 18 through pneumatic cylinder 24 which generates the vertical motion of compliant end effector 14. The final motion of compliant end effector 14 is a rotation about the axis perpendicular to the plane parallel to the surface of conveyor 16. To grasp parts located upon conveyor 16, compliant end effector 14 uses a plurality of appendages 26 pneumatically powered and constructed from fabric reinforced bellows having Teflon fingertips. As the bellows are inflated, they curl similar to that of the human hand when a person grasps similar parts as those which would be located upon conveyor 16. Typically, conveyor 16 will have a variable speed and therefore incremental encoder 28 is connected to front roller 30 of conveyor 16 to measure the belt position at all times.

While not shown, pneumatic pick-and-place robot 12 is controlled at a high level by a personal computer such as a IBM compatible 486 DX2 66 MHz operating under an OS/2 operating system. Due to the complexity of pick-and place-robot 12 and part tracking system 10, the OS/2 operating system is needed to provide multi-tasking capabilities. It should also be apparent that many types of other multi-tasking operating systems such as UNIX would be appropriate along with many non-multi-tasking systems operating at high speeds, as is becoming more and more prevalent. A low level computer controller monitors and directs servo valves and reads incremental encoder 28 along with handling other types of digital input and output signals. Many other components make up the electrical system used to control pick-and-place robot 12 and part tracking system 10 such as transformers, contactors, optical relay switches, fuses, motor amplifiers as well as a plurality of digital computer connections. To implement the pneumatic functions such as movement of appendages 26, pressures hoses, solenoid and servo valves, filters, regulators and manifolds are included as one of ordinary skill in the art would recognize.

In operation, pick-and-place robot 12 is coupled electrically and physically to part tracking system 10 which provides pick-and-place robot 12 with coordinates for the location of a part upon conveyor 16 thereby allowing pick-and-place robot 12 to manipulate compliant end effector 14 to grasp and move the part upon conveyor 16 to a new predetermined location, such as a box for packaging the end product.

Part tracking system 10 is essentially comprised of a plurality of photoelectric sensors in a predetermined physical arrangement with respect to one another and all coupled to a computer which receives information, then processes and manipulates the information to provide pick-and-place robot 12 with coordinates for the location of the part upon conveyor 16. The principal behind part tracking system 10 is that it uses multiple photoelectric sensors at different angles directed across conveyor 16 which creates a field of detection to describe a generic part as a polygon containing at most 2n sides from the transitions of the sensors, where n is the number of photoelectric sensors. Each transition of the sensors provides a side of the polygon that circumscribes the part. From this the vertices of the polygon can be determined which are used to calculate the centroid and angle of the major axis of the part. Pick-and-place robot 12 then uses the centroid and angle of the major axis to manipulate compliant end effector 14 to grasp a part on conveyor 16.

Figure 2:
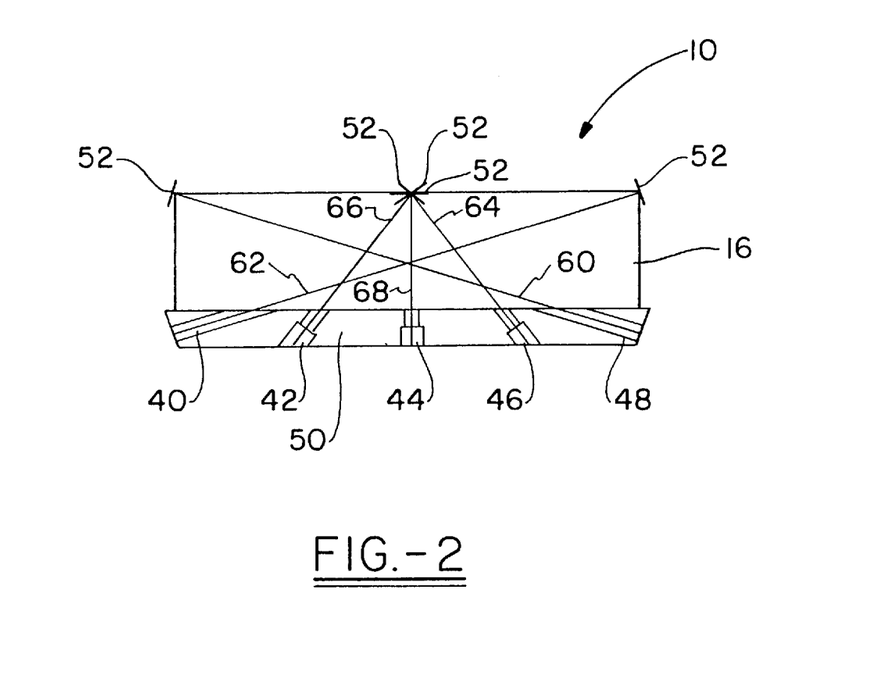
FIG. 2 shows a top plan view of the array of photoelectric sensors and their associated beam angles with respect to a conveyor.

Part tracking system 10, as shown in FIG. 2, is comprised of a plurality of photoelectric sensors 40, 42, 44, 46 and 48 arranged at various predetermined angles so their beam paths circumscribe a part as it passes through the beam paths to approximate the part outline or closed line integral with a polygon. In the preferred embodiment, base or mounting plate 50 maintains plurality of photoelectric sensors in a fixed predetermined position along one side of conveyor 16. Five photoelectric sensors are used in the preferred embodiment to achieve the highest performance from part tracking system 10.

The optimum relationship of the angles of the plurality of photoelectric sensors is defined as the one yielding the lowest error in terms of the centroid in the X and Y directions and the error of the axis of rotation. Also, the optimum number of sensors will be defined as the fewest sensors that can still perform at the specified accuracy. Although the preferred embodiment is comprised of five photoelectric sensors the true spirit of the invention is not limited to five photoelectric sensors as several assumptions were involved in deciding upon this number. Some of these assumptions included the shape of the part which part tracking system 10 would monitor, that the maximum angle in the sensor array along conveyor 16 is 70° which was used to limit the amount of area needed by conveyor 16 for part tracking system 10, that part tracking system 10 will be symmetric about a line perpendicular to the direction of conveyor 16, and for an odd number of sensors, there is a sensor along the line perpendicular to the direction of conveyor 16 and that this angle is referred to as 0° sensor 44. Depending upon the assumptions made and the physical constraints in which part tracking system 10 must operate, the optimum number of photoelectric sensors may vary and Applicant considers such variations within the true scope of his invention.

Through computer simulation Applicant determined the optimum solution for beam path angles of the five photoelectric sensors are +/−72°, +/−36° and 0° with photoelectric sensor 40 positioned at −72°, photoelectric sensor 42 positioned at −36°, photoelectric sensor 44 being the 0° sensor, photoelectric sensor 46 positioned at +36° and photoelectric sensor 48 positioned +72°. The type of photoelectric sensor is not critical to Applicant's invention but several features are considered desirable depending upon the environment part tracking system 10 is used. When used in the poultry industry, the selection of the sensors is based on the cost, sensing distance, and wash down ability. The sensing distance needs to extend across conveyor 16 at each angle of the sensor. The wash down ability is necessary for environments where wet and slippery parts can contaminate conveyor 16. This is especially important in the food processing industry where production lines must be cleaned periodically. Water can ruin sensors that are not protected from these types of environments. Another problem that water presents is the formation of water droplets on the sensors which can distort the optics and measurements.

Many photoelectric sensors can be selected "off the shelf" and Applicant chose Banner retro reflective C030 series sensors which essentially act as on/off switches. These particular sensors are housed in a Lexan case capable of withstanding wash down conditions. Both sending and receiving parts are located in the sensor and protected by the same Lexan housing. Retro-reflective tape 52 is used to reflect the incident light back to the associated plurality of photoelectric sensors. The Banner photoelectric sensors are inexpensive and capable of a maximum sensing distance of about 16 feet, which was adequate under the physical constraints and assumptions listed above.

Between each photoelectric sensor and its associated retro-reflective tape 52, a plurality of beam paths are formed across conveyor 16. The beam paths correspond to the angles of their associated photoelectric sensors as shown in FIG. 2 and consist of +72° beam path 60, +36° beam path 64, 0° beam path 68, −36° beam path 66 and −72° beam path 62.

Figure 3:
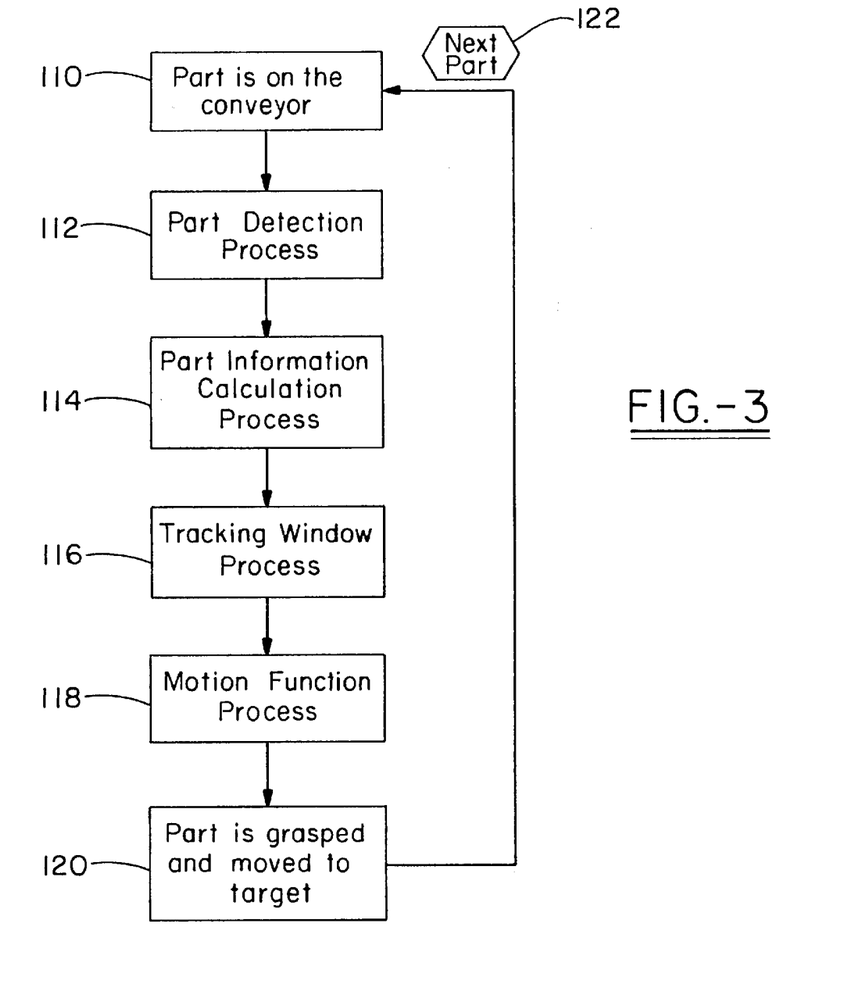
FIG. 3 shows a high level flow chart of the part tracking system of the present invention.

FIG. 3 shows a high level flow chart of the implementation of part tracking system 10, conveyor 16 and pick-and-place robot 12. To begin the process, at 110 a part, such as a piece of poultry is placed on conveyor 16. As the part passes through the array of photoelectric sensors part tracking system 12 begins part detection process 112. Next, part information calculation process 114 derives the parts coordinates upon conveyor 16 by manipulating the information received from part detection process 112. Tracking window process 116 receives the parts location coordinates from part information calculation process 114 and receives information from incremental encoder 28 coupled to conveyor 16 to determine the position of the part upon conveyor 16 while conveyor 16 is moving. This information is then transferred to motion function process 118 which controls pick-and-place robot 12 thereby causing robot 12 to grasp and move 120 the part to a predetermined position. Upon delivering the part to its target destination the process repeats for the next part 122.

Figure 4:
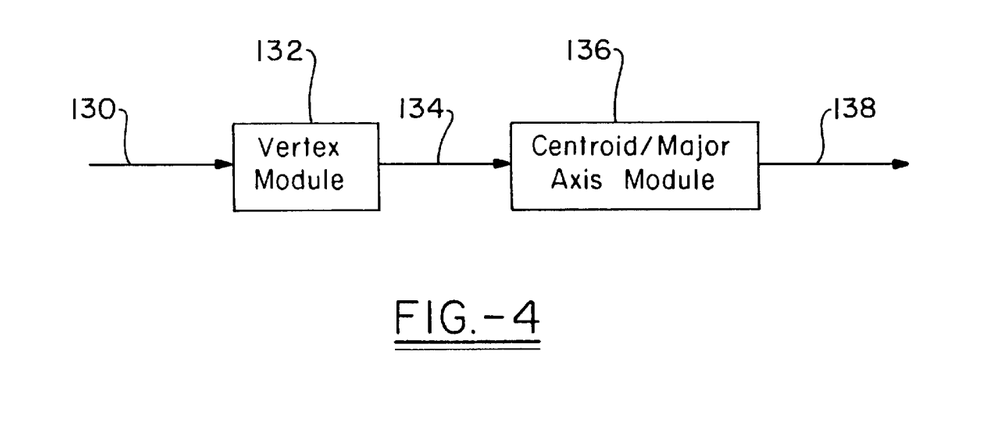
FIG. 4 shows a high level flow chart of steps involved in converting the photoelectric sensor transitions to the coordinates of the vertices of the work piece and then further manipulating the coordinates of the vertices to calculate the centroid and major axis of a polygon representing the shape of the work piece.
Figures 5A, 5B:
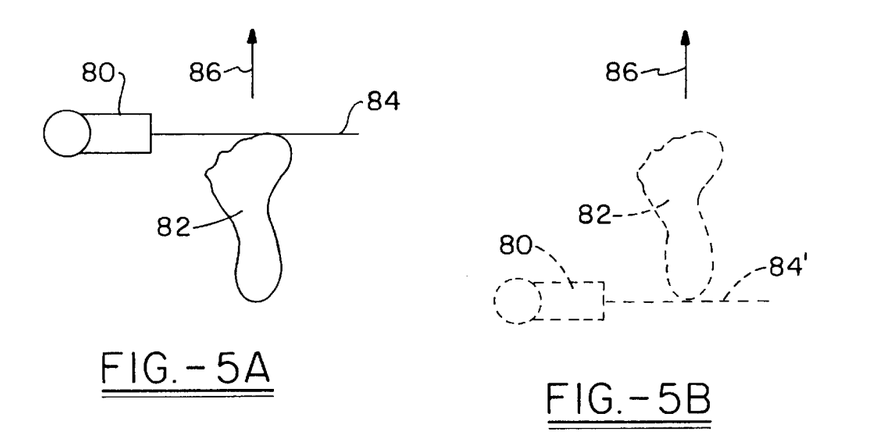
FIGS. 5a and 5b show a simplified top plan view of a work piece and the associated on and off transitions of a photoelectric sensor as the work piece is conveyed through the photoelectric sensors beam.

A model of photoelectric part tracking system 10 will now be described in more detail. The model of system 10 is composed of two modules called vertex module 132 and centroid/major axis module 136 as shown in FIG. 4. Vertex module 132 computes the vertices of the polygon that circumscribes a part upon conveyor 16 by using sensor transitions 130. From sensor transitions 130, the X and Y coordinates of vertices 134 are computed and centroid/major axis module 136 uses the coordinates to calculate centroid and major axis 138 of the polygon. Centroid/major axis module 136 requires the vertices formed by the intersection of the photoelectric beams. Vertices can be calculated by assuming the transitions of the photoelectric sensors to be lines at different slopes. As shown in FIG. 5, for each photoelectric sensor 80 two lines are formed about unsymmetrical part 82 for each transition of beam path 84. FIG. 5a shows beam path 84 of photoelectric sensor 80 being broken or turned off as unsymmetrical part 82 travels in the direction indicated by arrow 86 creating the first of the two lines. FIG. 5b is similar to FIG. 5a except unsymmetrical part 82 has progressed far enough in the direction indicated by arrow 86 that it has finished passing through beam path 84 thereby providing beam path 84' or the on transition which represents and the second of the two lines formed about the part.

The equations for these lines are $$y = m_i x + b_i \quad \text{EQ.1}$$

where m is the slope of photoelectric sensor 80 relative to the perpendicular of the direction of conveyor 16, i is the index number of photoelectric sensor 80 and b is incremental encoder 28's measurement (integer value) which is the intercept for the line. Since two lines per photoelectric sensor 80 are generated by tripping the sensors ON and OFF, there will be exactly twice as many lines as there are sensors. The coordinates of the polygon which circumscribed the part are formed by the intersection of the blocking and unblocking lines formed by sensors;

$$y = m_i x + b_i \quad \text{EQ.2}$$

$$y = m_{i+1} x + b_{i+1} \quad \text{EQ.3}$$

where the intercepts $b_i$ are formed from the blocking or unblocking of photoelectric sensors 80. The resulting equation for the X coordinate of the intersection point is $$x = \frac{(b_{i-1} - b_1)}{(m_i - m_{i+1})} \quad \text{EQ. 4}$$

and Y can be calculated using either EQ.2 or EQ.3. This point is one vertex of polygon 90 shown in FIG. 6. Part tracking system 10 uses angles +/−72°, +/−36°, and 0° for the plurality of photoelectric sensors. The following is an example of how a vertex is calculated. Beginning where +72° sensor 48 is unblocked and −72° sensor 40 is blocked, the equations of the lines determine intersection point 102.

$$y = \tan(72°) \cdot x + b_{72\ degree\ unblocked} \quad \text{EQ.5}$$

$$y = \tan(-72°) \cdot x + b_{72\ degree\ blocked} \quad \text{EQ.6}$$

$$x = \frac{(b_{-72blocked} - b_{72unblocked})}{(\tan(72°) - \tan(-72°))} \quad \text{EQ. 7}$$

The remaining vertices are computed in a counterclockwise manner with the next point formed by the blocking of −72° sensor 40 and −36° sensor 42. Centroid/major axis module 136 utilizes these vertices to compute the centroid and major axis of polygon 90 which is approximately that of unsymmetrical part 82.

Once vertex module 132 derives the X and Y coordinates of vertices 134 for polygon 90 from photoelectric sensor transitions 130, centroid/major axis module 136 determines the centroid by applying Green's Theorem. Green's Theorem expresses a double integral over a plane region in terms of a line integral around a simple closed curve C in the X-Y plane.

To begin, the formula for the area of a polygon given the planar coordinates of the vertices $(x_i, y_i)$ is $$\frac{1}{2}(x_1 y_2 + x_2 y_3 + \ldots + x_{n-1} y_n + \quad \text{EQ. 8}$$

$$x_n y_1 - y_1 x_2 - y_2 x_3 - \ldots - y_{n-1} x_n - y_n x_1)$$

For a simply connected area in the plane and functions P(x,y) and Q(x,y), Green's Theorem is $$\int\int_R (-\partial P/\partial y + \partial Q/\partial x) dx dy = \oint_C (P dx + Q dy) \quad \text{EQ. 9}$$

S. F. Bockman determined that the area formula can be reproduced by setting P(x,y)=0 and Q(x,y)=x and applying these to EQ.9. The theorem calculates the area based on the closed line integral of polygon 90. This line integral is composed of segments which link the vertices of the polygon. The area formula is derived as follows:

$$\int_{area} da = \int_{area} (-dP/dy + dQ/dx) dx dy = \int_{boundary} x dy \quad \text{EQ. 10}$$

Assuming the polygons vertices are numbered counterclockwise from 1 to N and are given in X-Y coordinates, then the required integration yields where $x_{N+1} = x_1$ and $y_{N+1} + y_1$, or $$\text{Area} = (1/2) \sum_{i=2}^{N+1} (x_i + x_{i-1})(y_i - y_{i-1}) \quad \text{EQ. 11}$$

Similarly, the first and second moments of inertia with respect to the x-axis and the product of inertia can be calculated by setting P=0 and Q=$x^2$/2, Q=$x^3$/3 and Q=$x^2 y$/2, respectively. The results of the integration are computed by Bockman to be:

$$\int x \, dx \, dy = (1/6) \sum_{i=2}^{N+1} (x_i^2 + x_i x_{i-1} + x_{i-1}^2)(y_i - y_{i-1}) \quad \text{EQ. 12}$$

$$\int x^2 \, dx \, dy = (1/12) \sum_{i=2}^{N+1} (x_i^3 + x_i^2 x_{i-1} + x_i x_{i-1}^2 + x_{i-1}^3)(y_i - y_{i-1}) \quad \text{EQ. 13}$$

-continued $$\int xy\, dx\, dy = (1/24) \sum_{i=2}^{N+1} \{[y_i(3x_i^2 + 2x_ix_{i-1} + x_{i-1}^2) + \quad \text{EQ. 14}$$

$$y_{i-1}(x_i^2 + 2x_ix_{i-1} + 3x_{i-1}^2)](y_{i-1})\}$$

The determination of the major axis of the polygon in an eigenvalue problem involving the second moment of inertia tensor (EQ.15). Ixx is the second moment of inertia with respect to the X-axis and Iyy is the second moment of inertia with respect to the Y-axis. Ixy is the mixed product of inertia.

$$\begin{bmatrix} Ixx & -Ixy \\ -Ixy & Iyy \end{bmatrix} \quad \text{EQ. 15}$$

These second moments of inertia are translated to the centroid from the referenced origin by the Parallel Axis Theorem. The complex number $\lambda$ and the complex vector v are said to be the eigenvalue and eigenvector of A if and only if: $Av=\lambda v$. This equation may be rewritten as $(A-\lambda I)v=0$ to solve the eigenvalue problem. This implies the determinant of $(A-\lambda I)=0$, written $(|A-\lambda I|=0)$, where A is the second moment of inertia tensor from EQ.15. This yields $$\left| \begin{bmatrix} Ixx & -Ixy \\ -Ixy & Iyy \end{bmatrix} - \lambda \begin{bmatrix} 1 & 0 \\ 0 & 1 \end{bmatrix} \right| = 0 \quad \text{EQ. 16}$$

$$\left| \begin{bmatrix} Ixx & -Ixy \\ -Ixy & Iyy \end{bmatrix} - \begin{bmatrix} \lambda & 0 \\ 0 & \lambda \end{bmatrix} \right| = 0 \quad \text{EQ. 17}$$

$$\left| \begin{bmatrix} Ixx-\lambda & -Ixy \\ -Ixy & Iyy-\lambda \end{bmatrix} \right| = 0 \quad \text{EQ. 18}$$

$$\lambda^2 - \lambda(Ixx+Iyy) + Ixx \cdot Iyy - Ixy^2 = 0 \quad \text{EQ.19}$$

$$\lambda = \frac{Ixx + Iyy \pm \sqrt{(Ixx+Iyy)^2 - 4(Ixx \cdot Iyy - Ixy^2)}}{2} \quad \text{EQ. 20}$$

Normalizing Ixx and Iyy: Ixx+Iyy=1

$$\lambda = \frac{1 \pm \sqrt{1 - 4(Ixx \cdot Iyy - Ixy^2)}}{2} = \frac{1 \pm \sqrt{1 + 4(Ixy^2 - Ixx \cdot Iyy)}}{2} \quad \text{EQ. 21}$$

The desired eigenvalue $\lambda$ for the major axis calculation is the lesser value of the two eigenvalues. This quantity is represented in EQ.22 by E. The angle calculation is as follows:

$$\text{Angle} = \frac{\tan^{-1}(Ixx - E)}{Ixy} * \frac{45.0}{\tan^{-1}(1.0)} \quad \text{EQ. 22}$$

The fraction $45.0/(\tan^{-}(1.0))$ is a conversion factor for radians to degrees and therefore this equation returns the angle in degrees from the X axis. The formulae explained in EQS. 11 through 22 is referred to as centroid/major axis module 136 for part tracking system 10. The vertices of polygon 90 ($x_i$, $y_i$,) are used to compute the area, first and second moments from which the centroid and major axis of rotation are calculated.

Work had been done to generalize the formula to a polygon with n sides and the results are displayed in EQS. 11 through 22. Centroid/Major Axis module 136 can be thought of as a black box that requires the vertices of polygon 90 in the X-Y plane and will return the X and Y centroid in the same units as the vertices and the major axis in degrees.

Figure 6A:
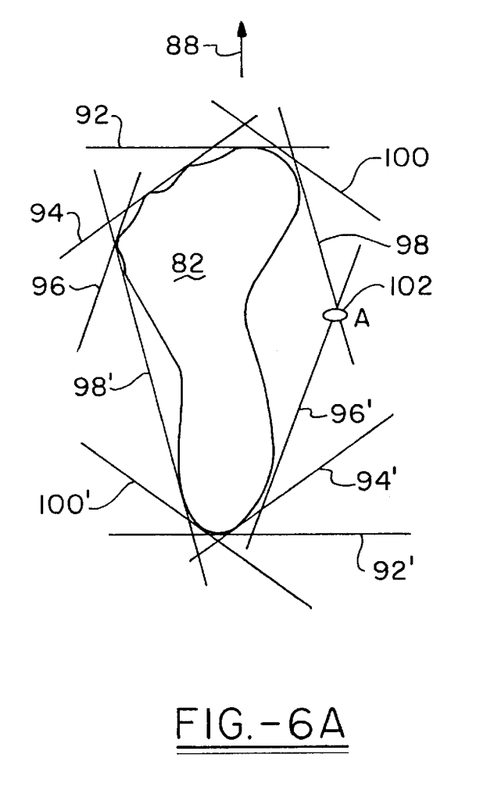
Figure 6B:
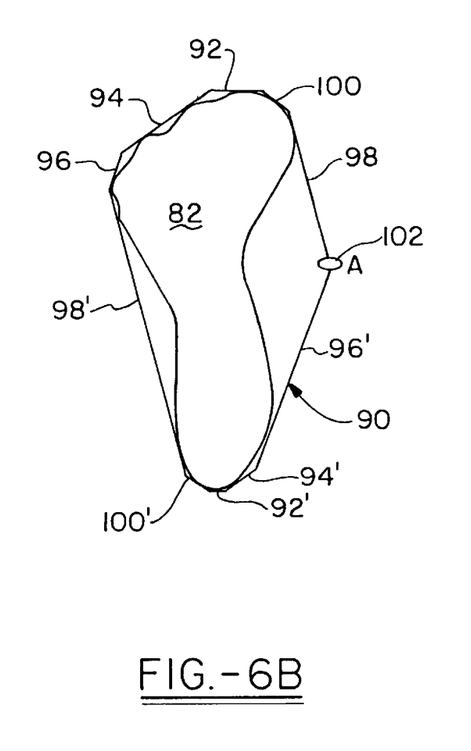
FIG. 6b shows the resulting polygon representative of the work piece's shape formed by the intersections of the beam path transitions.

FIG. 6 shows the plurality of beam paths in which unsymmetrical part 82 will pass when moved upon conveyor 16 in the direction of arrow 88. FIG. 6a shows the intersection of the beam paths with unsymmetrical part 82 and with each other. Each on/off transition of the associated beam path is labeled as follows: 0° beam off transition 92, 0° beam on transition 92', +36° beam off transition 94, +36° beam on transition 94', +72° beam off transition 96, +72° beam on transition 96', −72° beam off transition 98, −72° beam on transition 98, −36° beam off transition 100, and −36° beam on transition 100'. FIG. 6b shows polygon 90 derived by eliminating the excess beam paths shown in FIG. 6a beyond their points of intersection. Polygon 90 is an approximate representation of unsymmetrical part 82 which is sufficiently close to the actual shape of unsymmetrical part 82 to allow pick-and-place robot 12 to manipulate part 82.

In order to process the information gathered by the array of photoelectric sensors software is used to read and store the states of the plurality of photoelectric sensors. The software program continuously loops through a simple program which checks the sensors for transitions. Once a transition occurs, incremental encoder 28's position at the time of the transition is placed in a storage location until all the transitions for part 82 are complete. A flag tells the robot controller that part 82 is ready for processing. The data is then read by the computer and the centroid and major axis are computed. The results are then transferred to the necessary software and computer to instruct pick-and-place robot 12 when and where to move to pick up part 82.

While any number of computer and software combinations may be used to implement the above described functions, in the preferred embodiment a low level controller reads the plurality of photoelectric sensor transitions and controls the solenoid valves of the pneumatic controls system of pick-and-place robot 12 for motion and gripping. The low level controller, not shown, receives conveyor 16 position signals from incremental encoder 28 coupled to conveyor 16. It also receives position signals from incremental encoders for the horizontal and rotational axis of pick and place robot 12, neither of which are shown.

Controlling pick-and-place robot 12 is inherently a multitasking chore. Since there is finite number of tasks that a high level operating can handle, in this case OS/2, the low level controller is used for tasks such as robot motion control through a PID control algorithm. The low level controller is also used to store the transitions of the plurality of photoelectric sensors until all the information for a part is ready. There exists a possibility that more than one part can be in the sensing area. A cueing system is therefore needed to keep the information on multiple different parts in an organized fashion. For the case of multiple parts that do not overlap, the first part's encoder positions are stored in a queue for part one and the information for part two is recorded in a separate queue. The computer reads the information in part one's queue and resets it, part two's queue is dumped into part one's queues and part two's queue is reset.

Figure 7:
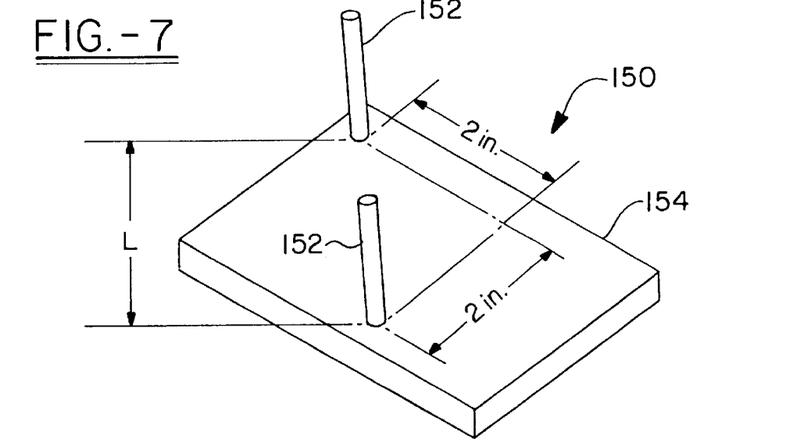
FIG. 7 shows a perspective view of a two legged fixture used for calibrating the part tracking system of the present invention.

Through testing it was found that pick-and-place robot 12 in conjunction with part tracking system 10 was successful in grasping polygons resembling the parts about 95% of the time. Through further analysis it was determined that most errors were due to incorrect calibration. Calibration errors are formed by the incorrect alignment of the plurality of photoelectric sensors to there corresponding angles. Another way that calibration effected the performance was through incorrect distances between the plurality of photoelectric sensors along the edge of conveyor 16. To form polygon 90, the transitions of the plurality of photoelectric sensors are translated to 0° sensor 44. This translation is accomplished by adding or subtracting the distances to or from the transitions of the remaining photoelectric sensors. Initially, the distances are measured using a tape measure. Where to begin and end the measurement is what leads to calibration errors. To correct these errors a fixture is placed on conveyor 16 that is used to determine the angles and distances between the plurality of photoelectric sensors by executing a software program to calculate the best solution. FIG. 7 shows two-legged calibration fixture 150 which is comprised of base plate 154 with two dowels 152 extending vertically from base plate 150 spaced $2\sqrt{2}$ inches along a 45° diagonal of rectangular base plate 154. Calibration fixture 150 is placed at a known distance and angle with respect to the array of photoelectric sensors of part tracking system 10. Part tracking system 10 is calibrated by making a run with calibration fixture 150 and then recalculating the angles of the plurality of photoelectric sensors and the distances to the sensors relative to 0° photoelectric sensor 44. The resulting calibrated angles and distances are then updated within the software to compute polygon 90's approximation and therefore its vertices/centroid and major axis in a more accurate fashion. The calibration program determines the actual angles and distances by analyzing the drawings shown in FIG. 9.

Phi($\Phi$) is the reference angle measured from the line perpendicular to the array of photoelectric sensors while Theta($\Theta$) is the angle between dowels 152 of calibration fixture 150 and the perpendicular to the sensing array (dashed lines in FIGS. 9). The distance $Y_i$ is the distance parallel to the direction of conveyor 16 between dowels 152 of calibration fixture 150 in incremental encoder counts from the perspective of sensor$_i$.

Figure 9A:
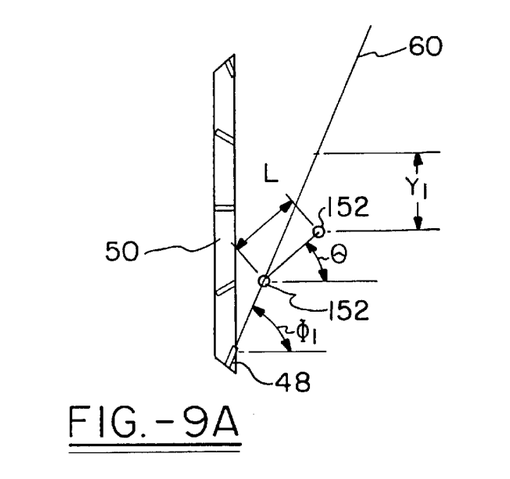
FIG. 9a through 9d show four of the five individual photoelectric sensor beam and calibration angles superimposed upon the photoelectric sensor array.

By the Laws of Sines in FIG. 9*a*:

$$\frac{\sin(\Phi_1 - \Theta)}{Y_1} = \frac{\sin(90 - \Phi_1)}{L} \quad \text{EQ. 23}$$

Expanding this result $$L(\sin \Phi_1 \cos \Theta - \cos \Phi_1 \sin \Theta) = Y_1 \cos \Phi_1 \quad \text{EQ.24}$$

Dividing both sides by $\cos \Phi_1$ $$L(\tan \Phi_1 \cos \Theta - \sin \Theta) = Y_1 \quad \text{EQ.25}$$

Combining like terms and solving for $\Phi_1$ $$\Phi_1 = \tan^{-1}\left(\frac{\frac{Y_1}{L} + \sin\Theta}{\cos\Theta}\right) \quad \text{EQ. 26}$$

Figure 9B:
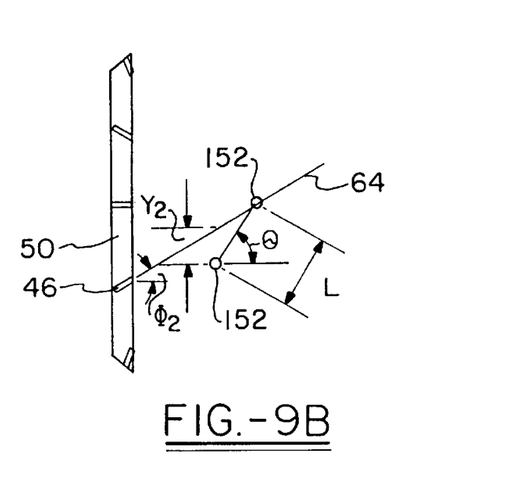

Similarly, in FIG. 9*b*, it can be shown $$\Phi_2 = \tan^{-1}\left(\frac{\frac{Y_2}{L} + \sin\Theta}{\cos\Theta}\right) \quad \text{EQ. 27}$$

Figures 9C, 9D:
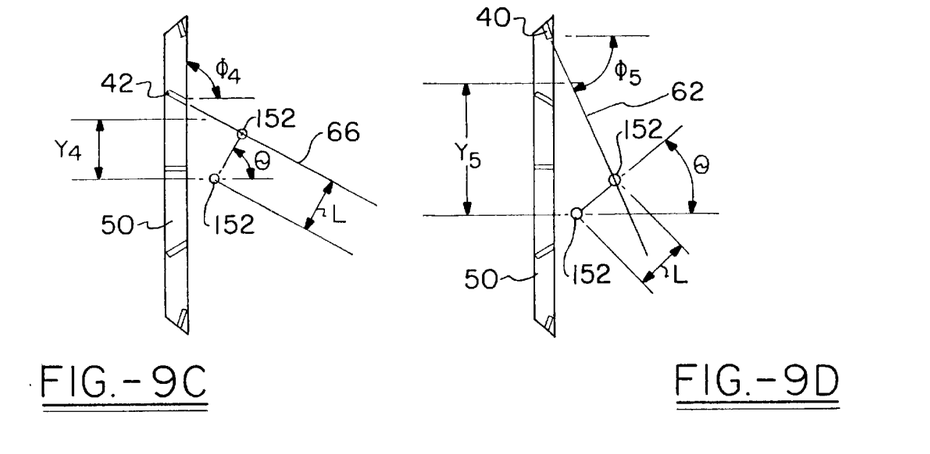

The difference in EQ.26 and EQ.27 is that in equation EQ.26, the leftmost dowel 152 blocks the sensor first (see FIG. 9*a*) and in EQ.27 the right dowel 152 blocks the sensor first. Referring to FIG. 9*c* and FIG. 9*d*, a similar method for computing the angles and distances for sensors below 0° photoelectric sensor 44 is used. The formulation is the same as before:

$$\Phi_4 = \tan^{-1}\left(\frac{\frac{Y_4}{L} - \sin\Theta}{\cos\Theta}\right) \quad \text{EQ. 28}$$

$$\Phi_5 = \tan^{-1}\left(\frac{\frac{Y_5}{L} - \sin\Theta}{\cos\Theta}\right) \quad \text{EQ. 29}$$

The calculatin of 0° photoelectric sensor 44 (Phi 3), assumed to be at 0 degrees, is the least of the following two calculations:

$$\Phi_3 = \min\left[\text{abs}\left\{\tan^{-1}\left(\frac{\cos\Theta}{\frac{Y_3}{L} - \sin\Theta}\right), \tan^{-1}\left(\frac{-\cos\Theta}{\frac{Y_3}{L} - \sin\Theta}\right)\right\}\right] \quad \text{EQ. 30}$$

Figure 10A:
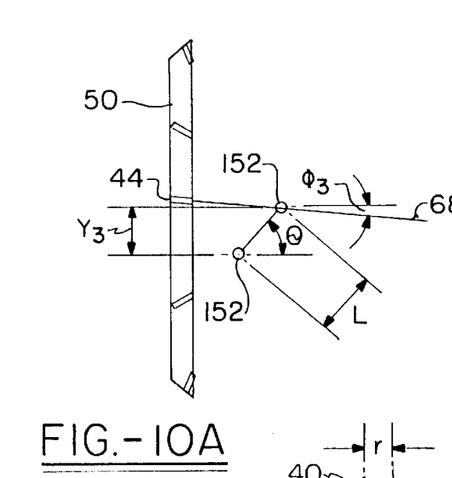
FIG. 10a and 10b show different scenarios presented by the task of calibrating the center photoelectric sensor.
Figure 10B:
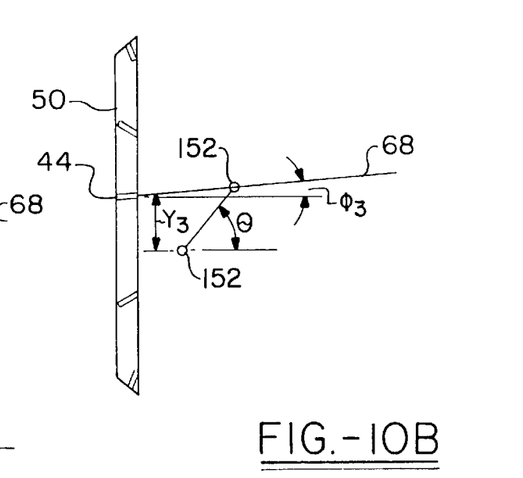

The reason for two possible answers is that the zero degree sensor can be either on the positive or negative side of zero. FIG. 10 illustrates the two scenarios. Using similar triangles, the distance between the four angled photoelectric sensors (40, 42, 46, and 48 respectively) and 0° photoelectric sensor 44 is $d_1$–$d_4$, respectively:

$$d_1 = (D_1 + D_2) + r \cdot \tan \Phi_1 - r \cdot \tan \Phi_3 \quad \text{EQ.31}$$

$$d_2 = (D_2) + r \cdot \tan \Phi_2 - r \cdot \tan \Phi_3 \quad \text{EQ.32}$$

Figure 11:
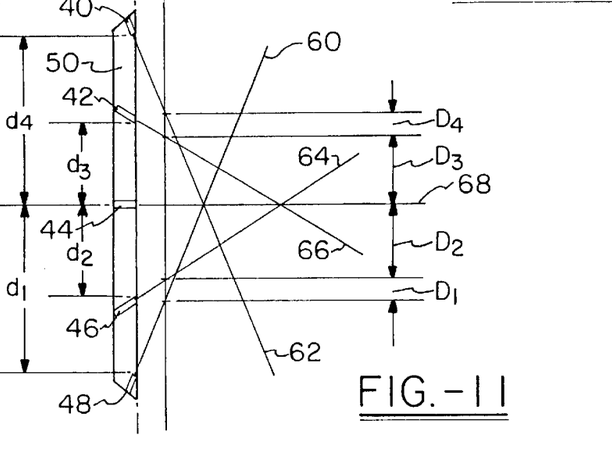
FIG. 11 shows a top plan view of the array of photoelectric sensors with varying distance definitions between the sensors displayed.

In FIG. 11, $d_i$ is the difference in encoder positions while passing the sensors.

$$d_3 = D_3 + r \cdot \tan \Phi_3 + r \cdot \tan \Phi_4 \quad \text{EQ.33}$$

$$d_4 = (D_3 + D_4) + r \cdot \tan \Phi_3 + r \cdot \tan t\Phi_5 \quad \text{EQ.34}$$

Figure 8:
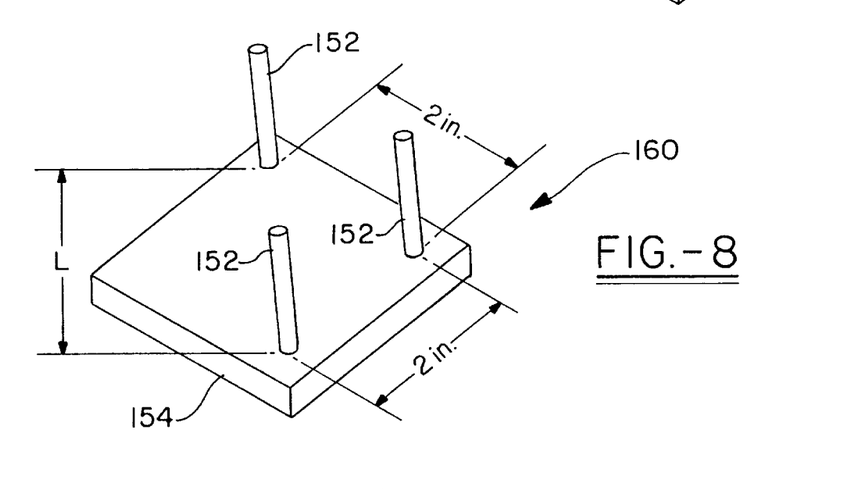
FIG. 8 shows a perspective view of a three legged fixture used for calibrating the part tracking system of the present invention.

Referring to FIG. 8, three legged calibration fixture 160 is shown again comprised of face plate 154 and having three dowels 152 extending vertically therefrom. Three legged calibration fixture 160 does not require placement at a known distance or at a known angle from the plurality of photoelectric sensors. Calibration fixture 160 is placed anywhere on conveyor 16 as long as dowels 152 of fixture 160 do not block any of the other dowels 152 from any beam path of the associated photoelectric sensors.

Figure 12:
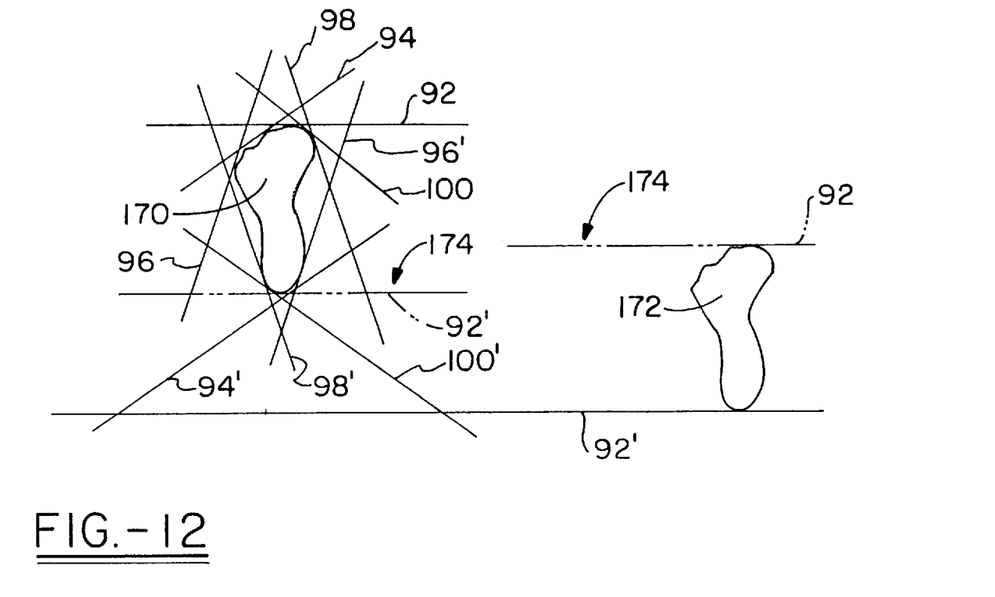
FIG. 12 shows a simplified top plan view of two work pieces and how their overlapping within the photoelectric array can cause inaccurate calculations.

FIG. 12 depicts the problem encountered when a plurality of parts on conveyor 16 overlap a particular photoelectric sensor. When this happens two parts will appear to be a single part for that particular sensor which is overlapped. Overlap problems affect the queuing on the low level controller and therefore affects to the centroid and major axis calculations as well. FIG. 12 shows how overlapping sensors are formed by the beams. (The dashed lines are where the overlapped sensors should have detected the part).

In the event that two parts overlap a photoelectric sensor, the first part 170 blocks the sensor and the second part 172 unblocks it. Both these transitions are attributed to first part 170 and no data is given to second part 172. Because there is overlap, there will be one less reading for second part 172. The rest of the parts to follow will all have less than the required number of measurements.

The domino effect is the result of the software on the low level motion controller's microprocessor. The program waits to send to the transitions of the part in groups of ten, i.e. all the data is stored. If an overlap occurs, one sensor's data is missing for the second part and the program will not send all the parts information until that particular sensor's data is received. The missing data is taken from the next part. In turn, the next part is lacking one sensor's data and so on. For this reason, the low level controller has a non-recoverable error when overlapping occurs. This non-recoverable error exists when an encoder reading is already in the queue before a part enters the sensing array. The closer two parts are to one another, the harder it will be for the robot to effectively grasp both parts.

Overlap occurs when two or more parts pass a sensor and the sensor makes only two transitions (OFF, ON) instead of four (OFF, ON, OFF, ON). The result of the overlap is that the ON transition of the sensor is actually for second part 172 instead of first part 170. Thus, information is not available for second part 172. The ON transition for first part 170 and the off for second part 172 are missing for a particular sensor. The ramifications of this event are that due to the overlap, the ON transition for first part 170 creates a fishtail effect 180 (see FIG. 13).

Figure 14:
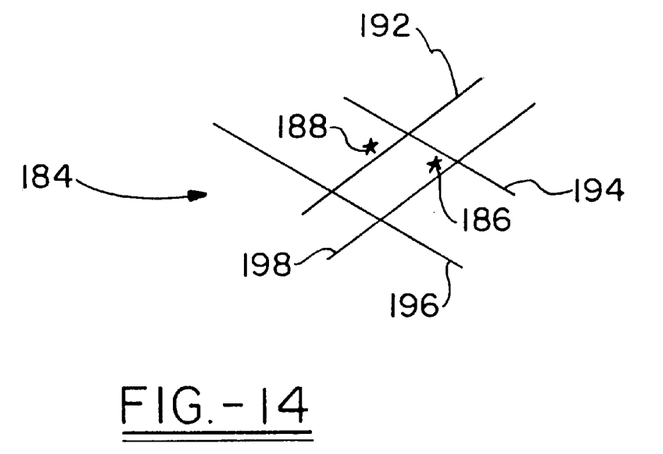
FIG. 14 shows an area formed by the intersection of the photoelectric sensors with correct and incorrect points of reference in relation to the area.

The recovery strategy for this problem is (1) identify the overlap of the sensors: (2) recalculate first part 170 and second part 172 based on knowledge of which photoelectric sensors were overlapped; and (3) attempt to pick up both first part 170 and second part 172. An after the fact method of checking the part after part tracking system 10 has computed the end result is employed to correct these errors. As shown in FIG. 14, each vertex can be identified as a good vertex 186 if that vertex is within area 184 resulting from the intersections of the beam transitions. A good vertex 186 is a point that lies between all the lines made by sensor transitions. A bad vertex 188 is a point that lies outside at least one set of sensor transitions. Notice that bad vertex 188 is between one set of lines but not the other.

Figure 13:
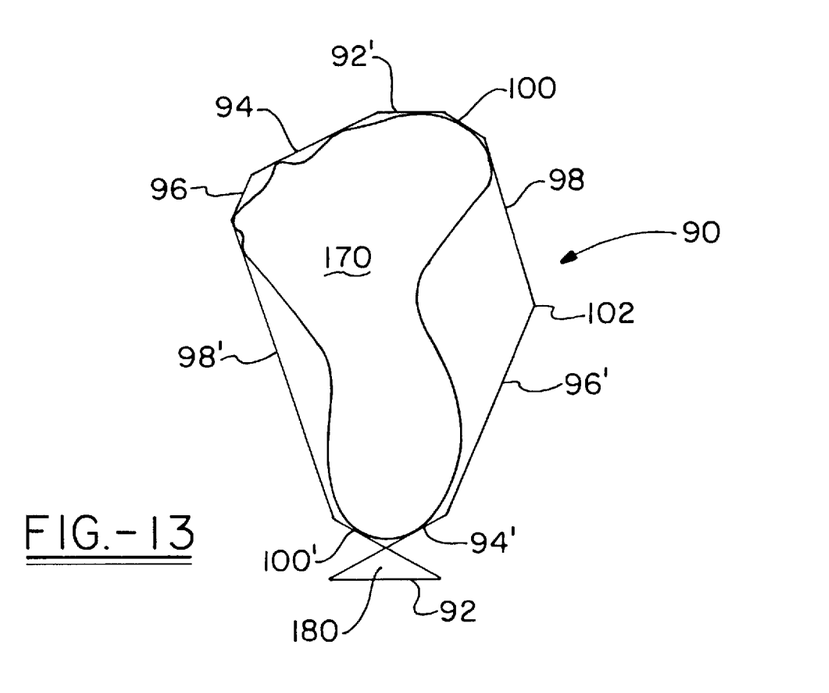
FIG. 13 shows a simplified top plan view of a work piece and the fishtail effect in the polygon calculation that results from the overlap shown in FIG. 12.
Figure 15:
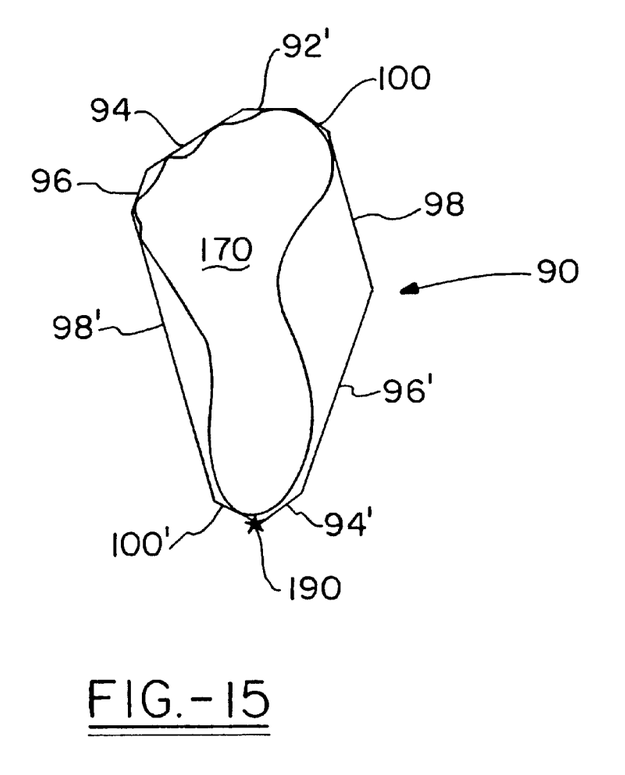
FIG. 15 shows a simplified top plan view of a work piece and the resulting polygon which is formed upon detection and correction of the overlap shown in FIG. 12.

Recalculating part 170 is done in two ways. One way is to recalculate polygon 90 by skipping over the overlapped sensor(s). This would result in less vertices. The other way is to make a guess of intercepts that are overlapped and then recalculate both parts. A software program carries out the vertex test and determines which photoelectric sensor beams are overlapped. The vertices that are bad relate to an overlapped sensor's transition and by finding out which transition is overlapped, the transition can be removed. The fishtail seen in FIG. 13 is removed after the two bad vertices are identified and related to a transition. The removal of the transition results in new polygon 90 (see FIG. 15) without fishtail 180 and the centroid and major axis can now be calculated. The centroid and major axis errors will be improved.

The low level controller card needs to be corrected when the overlap affects future parts in the queue. To correct this domino effect, the transitions of the overlapped photoelectric sensor are placed in the queue for each first part 170 and second part 172. This eliminates the vacancy and corrects the queue. This gives each part one good transition and one bad one. The vertex checking routine determines which of the two transitions are bad. The recalculation can then drop the bad transition.

It is also to be understood that the present invention is quite versatile due to its being controlled and monitored by a computer. Such a part tracking system as described herein can also be used as a quality control inspection device for other industries. In production lines which output uniform objects, the present invention can be used to detect irregularities and trigger a mechanism to remove the irregular item from the assembly line. The array of photoelectric sensors allows a number of measurements to be calculated besides vertices of a polygon and its centroid and major axis angle. By using different algorithms, the computer coupled to the array of photoelectric sensors can calculate an objects area, angular orientation, center of gravity or moment of inertia from the crossings of the beam paths. Because assembly lines typically produce hundreds or thousands of the same object the measurements listed above must be the same for each object within a specified tolerance.

One example of the present invention used in an inspection process would be quality control on a box forming machine. If all boxes are the same size then upon their assembly they all should have a substantially equal area. Once the boxes are assembled they would be placed upon a conveyor and passed through the array of photoelectric sensors. From there the computer coupled to the array of photoelectric sensors would calculate each objects area and compare the calculated error to the set point area. If the calculated area was outside of a predetermined tolerance, the computer would send a triggering signal to a device to remove the defective box from the conveyor. The removal device could be one of any number of mechanism such as a mechanical arm, a pneumatic stopper or even just an actuator to signal a worker to remove the defective product. It should also be understood that the invention could be used as a quality control inspection device for any type of uniform goods or objects. Many other types of operations could also be implemented such as sorting of objects based on their areas or angular orientation, etc. The present invention provides a durable and inexpensive apparatus for tracking, monitoring and measuring objects that pass through the array of photoelectric sensors from which other automated operations can then be initiated.

Although the principals, preferred embodiments and preferred operation of the present invention have been described in detail herein, this is not to be construed as being limited to the particular illustrative forms disclosed. It will thus become apparent to this skilled in the art that various modification of the preferred embodiments herein can be made without departing from the spirit or scope of the invention as defined by the appended claims.

What is claimed is:

1. A tracking system for locating parts moving upon a conveyor and providing location coordinates for said part to a positioning apparatus, comprising:

an array of sensors arranged adjacent to said conveyor to provide a field of detection in an area along a predetermined portion of the surface of said conveyor, wherein said array of sensors are arranged at varying angles and directed across said conveyor to describe said part as a polygon;

at least one conveyor position sensor coupled to said conveyor to determine the location of said conveyor with respect to a predetermined reference; and a sensor interface coupled to said array of sensors, said at least one conveyor position sensor and said positioning apparatus, where said sensor interface receives data from said array of sensors and said conveyor position sensor, operates upon said data and provides said data to said positioning apparatus which in turn manipulates said part.

2. A part tracking system as recited in claim 1, wherein said array of sensors are a plurality of photoelectric sensors which describe said part as a polygon containing 2n sides from the transitions of said plurality of photoelectric sensors, where n is the number of said photoelectric sensors.

3. A part tracking system as recited in claim 2, wherein said array of sensors is made up of five photoelectric sensors located along one side of said conveyor with one of said photoelectric sensors directed perpendicular to the direction of travel of said conveyor and designated as being positioned at zero degrees with said remaining photoelectric sensors each aligned at a different predetermined angle from either side of said zero degree sensor.

4. A part tracking system as recited in claim 3, wherein said remaining photoelectric sensors are each aligned at approximately +72°, +36°, −36° or −72° with respect to said photoelectric sensor positioned perpendicular to the direction of travel of said conveyor which is designated as zero degrees.

5. A part tracking system as recited in claim 2, wherein said sensor interface is a computer which receives said transitions from said array of sensors and the corresponding location of said conveyor from said at least one conveyor position sensor, calculates the vertices of said polygon that circumscribes said part upon said conveyor and from said vertices calculates the centroid and major axis of said part.

6. A part tracking system as recited in claim 5, wherein said computer communicates to said positioning apparatus the centroid and major axis and location coordinates of said part upon said conveyor from which said positioning apparatus can locate and grasp said part upon said conveyor.

7. A part tracking system as recited in claim 2, wherein said array of sensors includes:
a plurality of photoelectric reflectors coupled at predetermined angles to the side of said conveyor opposite said photoelectric sensors with said plurality of photoelectric reflectors positioned to reflect the light beam of the corresponding photoelectric sensor,
wherein said plurality of photoelectric sensors and said plurality of photoelectric reflectors are positioned to create a field of detection in the predetermined portion of said conveyor for detecting said part upon said conveyor.

8. A part tracking system as recited in claim 2, wherein said photoelectric sensors are water resistant to allow them to be cleaned without damage resulting to said photoelectric sensors.

9. A calibration fixture for use with a part tracking system as recited in claim 2, comprising, a planar base with at least two dowels extending vertically from said planar base, said at least two dowels spaced $2\sqrt{2}$ inches along a 45° diagonal of said planar base.

10. A calibration fixture as recited in claim 9, further comprising, a third dowel extending vertically from said planar base in a predetermined relationship to said at least two dowels.

11. A method of detecting and determining the coordinates of the location of a part moving upon a conveyor, consisting of the steps of:
arranging an array of sensors at predetermined angles along said conveyor to create a field of detection in a predetermined portion of said conveyor;
passing said part moving upon said conveyor through said array of sensors wherein each transition of each of said sensors represents one side of a polygon that circumscribes said part;
measuring the location of said part upon said conveyor which corresponds with each transition of each of said sensors as said part passes through said array of sensors;
calculating the vertices of said polygon circumscribing said part; and
calculating the centroid and major axis of said part moving upon said conveyor.

12. A method of detecting and determining the coordinates of the location of a part moving upon a conveyor as recited in claim 11, wherein said polygon which circumscribes said part is formed by the intersection of the blocking and unblocking lines formed as said part moves through said array of sensors.

13. A method of detecting and determining the coordinates of the location of a part moving upon a conveyor as recited in claim 11, further including the step of transferring the location coordinates, centroid and major axis of said part to a positioning apparatus which uses the information to grasp and manipulate said part upon said conveyor.

14. An automated part manipulating system for grasping and moving parts comprising:
a pick-and-place robot;
a control system coupled to said pick-and-place robot, wherein said control system directs the functions of said pick-and-place robot; and
a part tracking system coupled to said control system, wherein said part tracking system determines the location coordinates and an approximation of the centroid and major axis for said part by providing a field of detection in which said part is described as a polygon, and wherein said part tracking system then transfers the location coordinates, centroid and major axis of said part to said control system which in turn directs said pick-and-place robot to grasp and manipulate said part.

15. An automated part manipulating system as recited in claim 14, wherein said pick-and-place robot has three degrees of freedom consisting of horizontal, vertical and 360° rotation about the vertical axis, said pick-and-place robot further comprises a compliant end effector having a plurality of extending appendages for grasping parts.

16. An automated part manipulating system as recited in claim 14, wherein said control system comprises:
a computer running a multi-tasking operating systems; and
a pneumatic system coupled to said computer, said pneumatic system also coupled to said pick-and-place robot to inflate and deflate said plurality of appendages which are comprised of bellows, said inflation and deflation of said bellows is controlled by said computer and causes said plurality of appendages to curl simulating the movement of a human hand.

17. An automated part manipulating system as recited in claim 14, wherein said part tracking system comprises:
an array of sensors physically arranged to provide a field of detection in the planar area parallel to a predetermined location, wherein said array of sensors consists of a plurality of photoelectric sensors and photoelectric reflectors arranged at varying angles to describe a part passing through said field of detection as a polygon from the transitions of said plurality of photoelectric sensors.

18. A part tracking system as recited in claim 1, wherein said sensor interface receives data from said array of sensors and said conveyor position sensor, said sensor interface calculates a physical characteristic of said part, and said sensor interface provides said positioning apparatus with instructions for manipulating said part.

19. A part tracking system as recited in claim 18, wherein said physical characteristic of said part which said sensor interface calculates is a characteristic selected from the group consisting of area, angular orientation, center of gravity and moment of inertia.

* * * * *